United States Patent
Capps, Jr. et al.

(10) Patent No.: US 7,617,403 B2
(45) Date of Patent: Nov. 10, 2009

(54) METHOD AND APPARATUS FOR CONTROLLING HEAT GENERATION IN A MULTI-CORE PROCESSOR

(75) Inventors: Louis Bennie Capps, Jr., Georgetown, TX (US); Warren D. Dyckman, Peekskill, NY (US); Michael Jay Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 11/459,988

(22) Filed: Jul. 26, 2006

(65) Prior Publication Data
US 2008/0028236 A1 Jan. 31, 2008

(51) Int. Cl.
*G06F 1/00* (2006.01)
*G06F 15/00* (2006.01)
*G05B 11/01* (2006.01)

(52) U.S. Cl. .................. 713/300; 713/323; 700/12; 700/14; 712/2

(58) Field of Classification Search .......... 713/300, 713/323; 700/12, 14; 712/28
See application file for complete search history.

(56) References Cited

U.S. PATENT DOCUMENTS

| | | | |
|---|---|---|---|
| 6,363,490 B1 | 3/2002 | Senyk et al. | |
| 6,393,374 B1 | 5/2002 | Rankin et al. | |
| 6,411,156 B1 | 6/2002 | Borkar et al. | |
| 6,415,388 B1 | 7/2002 | Browning et al. | |
| 6,484,265 B2 | 11/2002 | Borkar et al. | |
| 6,564,328 B1 | 5/2003 | Grochowski et al. | |
| 6,608,528 B2 | 8/2003 | Tam et al. | |
| 6,762,629 B2 | 7/2004 | Tam et al. | |
| 6,788,156 B2 | 9/2004 | Tam et al. | |
| 6,804,632 B2 * | 10/2004 | Orenstien et al. | ........... 702/188 |
| 6,908,227 B2 | 6/2005 | Rusu et al. | |
| 6,931,559 B2 | 8/2005 | Burns et al. | |
| 2003/0117759 A1 | 6/2003 | Cooper | |
| 2003/0126478 A1 | 7/2003 | Burns et al. | |
| 2003/0126479 A1 | 7/2003 | Burns et al. | |
| 2003/0188211 A1 | 10/2003 | Chen | |
| 2003/0204762 A1 | 10/2003 | Lee et al. | |
| 2004/0071184 A1 | 4/2004 | Naveh et al. | |
| 2004/0148528 A1 | 7/2004 | Silvester | |
| 2004/0158771 A1 | 8/2004 | Garnett et al. | |
| 2005/0044434 A1 | 2/2005 | Kahle et al. | |
| 2005/0102544 A1 | 5/2005 | Brewer et al. | |
| 2005/0138438 A1 | 6/2005 | Bodas | |
| 2005/0166075 A1 | 7/2005 | Hack | |
| 2005/0283624 A1 | 12/2005 | Kumar et al. | |
| 2006/0020831 A1 | 1/2006 | Golla et al. | |
| 2008/0005591 A1 * | 1/2008 | Trautman et al. | ........... 713/300 |

FOREIGN PATENT DOCUMENTS

WO    WO 00/26747    5/2000

OTHER PUBLICATIONS

Armstrong—"Advanced Virtualization Capabilities of Power 5 Systems", IBM JRD vol. 49 No. 4/5 Jul./Sep. (2005).

(Continued)

*Primary Examiner*—Thuan N Du
*Assistant Examiner*—Stefan Stoynov
(74) *Attorney, Agent, or Firm*—Matt Talpis; Mark P Kahler

(57) ABSTRACT

The disclosed methodology and apparatus may reduce heat generation in a multi-core processor. In one embodiment, a multi-core processor cycles selected processor cores off in a predetermined pattern across the processor die over time to reduce the average heat generation by the processor. The disclosed multi-core processor may reduce or avoid undesirable hot spots that impact processor life.

17 Claims, 5 Drawing Sheets

OTHER PUBLICATIONS

Bassemir—"IBM Lotus Domino 6.5 with IBM Virtualization Engine Tech" (Sept. 2005).
Crepps—"Improving Multi-Core Architecture Power Efficiency Through EPI Throttling and Asymmetric Multiprocessing", Technology @ Intel Magazine (Feb. 2006).
Felter—"A Performance-Conserving Approach for Reducing Peak Power Consumption in Server Systems", ICS'05, Jun. 2005.
Hofstee—"Power Efficient Processor Architecture and The Cell Processor", Proc. 11$^{th}$ Int'l Symposium HPCA, IEEE, Feb. 2005.
IBM Redbook—"CPU Resource Distribution by Power Hypervisor and Partition Load Manager, TIPS0427" (downloaded from http://publib-b.boulder.ibm.com on Jun. 3, 2006).
IBM Exec Brief—"Make it Simple. Virtualization Solutions Help Take the Cost . . . " (Jan. 2005).
Moskowitz—"Feature: A Virtual Machine Primer", Redmondmag. com (Aug. 2004).
Sailer 1—"sHype: Secure Hypervisor Approach to Trusted Virtualized Systems", IBM Research Report (Feb. 2, 2005).
Sailer 2—"Building a MAC-based Security Architecture for the XEN OpenSource Hypervisor", IBM Research Report (Jun. 8, 2005).

* cited by examiner

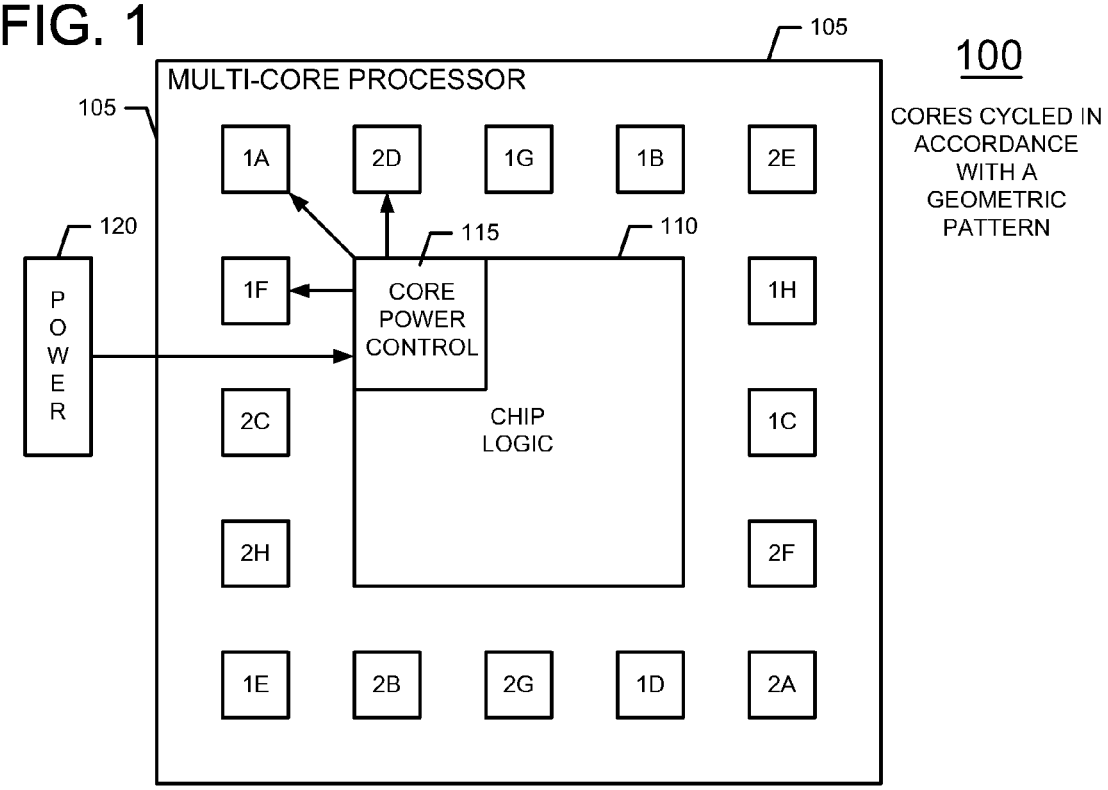
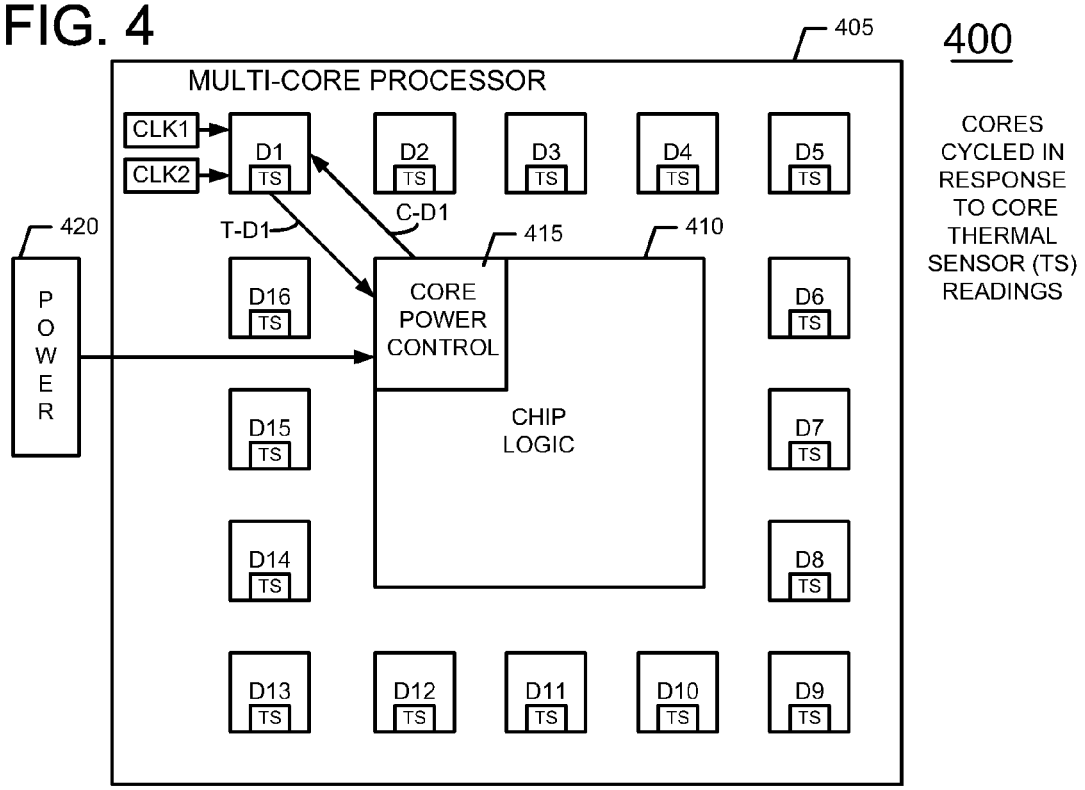

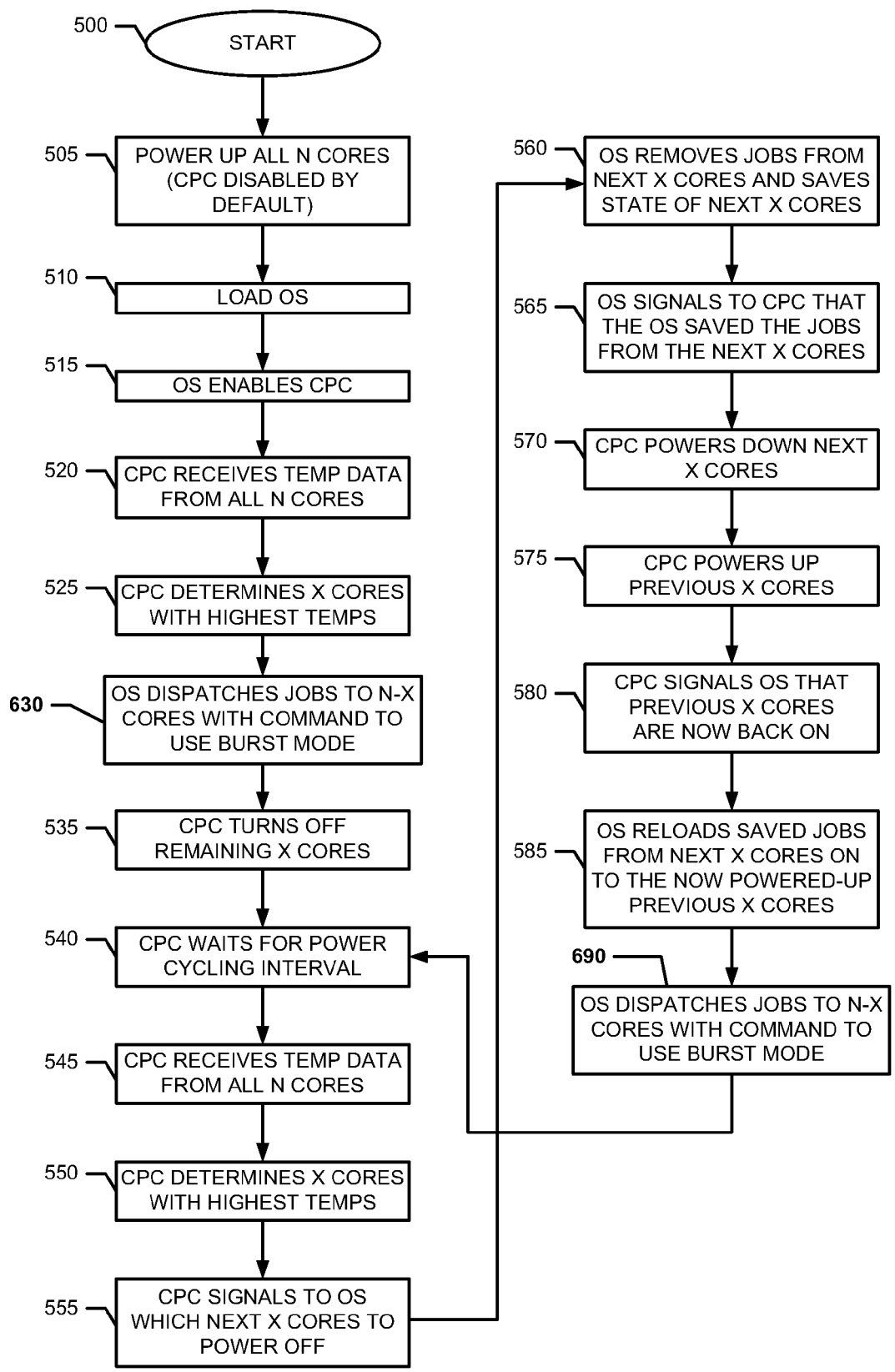

METHOD AND APPARATUS FOR CONTROLLING HEAT GENERATION IN A MULTI-CORE PROCESSOR

CROSS REFERENCE TO RELATED PATENT APPLICATIONS

This patent application relates to the U.S. Patent Application entitled "Method and Apparatus For Monitoring and Controlling Heat Generation in a Multi-Core Processor", inventors Capps, et al., application Ser. No. 11/460,014, filed Jul. 26, 2006, and assigned to the same assignee, the disclosure of which is incorporated herein by reference in its entirety.

TECHNICAL FIELD OF THE INVENTION

The disclosures herein relate generally to processor systems, and more particularly, to a method and apparatus that manages heat production in a multi-core processor.

BACKGROUND

As the performance of microprocessors increases over time, designers face an increasingly difficult heat generation problem. Clock throttling, the reduction of a processor's clock frequency when the processor generates too much heat, is one approach for reducing processor heat generation. While clock throttling can successfully prevent overheating in single core processors, this approach may substantially negatively impact processor performance.

Multi-core processors, namely those processors with multiple processor cores on a common integrated circuit die, may also experience significant heat generation problems. As the number of cores on a die increases, designers find it increasingly challenging to provide sufficient power and cooling to all of the cores in a manner that provides optimal performance. Multi-core processors may employ clock throttling to prevent overheating, but once again this approach sacrifices processor performance.

As multi-core processors proliferate and increase in speed, the problem of providing sufficient power to supply multi-core processors with the large switching currents they require becomes more difficult. Thermal density becomes even more significant as the semiconductor die size of multi-core processors decreases in some applications. In some cases, when the processor constantly uses a particular core to execute instructions, a hot spot develops on the semiconductor die at the location of the particular core. Local overheating of the die and processor failure may result from such a hotspot. To address this problem, conventional processors may set sufficiently low operating frequencies to ensure sufficient guardband so that these undesired conditions do not occur. Unfortunately, this approach may substantially limit the performance of the processor.

What is needed is a multi-core processor that manages the production of heat by the cores thereof.

SUMMARY

Accordingly, in one embodiment, a method is disclosed for controlling heat generation in a processor. The method includes receiving power by a processor that includes a plurality of processor cores on a common semiconductor die, each processor core being enabled or disabled. The method also includes controlling the processor cores, by a core power controller, such that different processor cores are disabled over time. In one embodiment, the disabling of different processor cores over time forms a pattern that spreads out heat generation across the semiconductor die to reduce the average heat generation by the processor.

In another embodiment, a multi-core processor is disclosed that includes a plurality of processor cores situated on a semiconductor die. The processor further includes a core power controller that is situated on the semiconductor die and that is coupled to the plurality of processor cores. The core power controller is configured to enable and disable each of the processor cores such that different processor cores are disabled over time. In one embodiment, the core power controller disables different processor cores over time to form a pattern that spreads out heat generation across the semiconductor die.

In yet another embodiment, an information handling system (IHS) is disclosed that includes a processor coupled to a memory. The processor includes a plurality of processor cores situated on a semiconductor die. The processor further includes a core power controller, coupled to the plurality of processor cores and situated on the semiconductor die. The core power controller is configured to enable and disable each of the processor cores such that different processor cores are disabled over time.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 1 shows one embodiment of the disclosed multi-core processor.

FIG. 4 shows another embodiment of the disclosed multi-core processor.

FIG. 6 is a flowchart depicting a burst mode variation of the process flow shown in FIG. 5.

DETAILED DESCRIPTION

Figure 2:
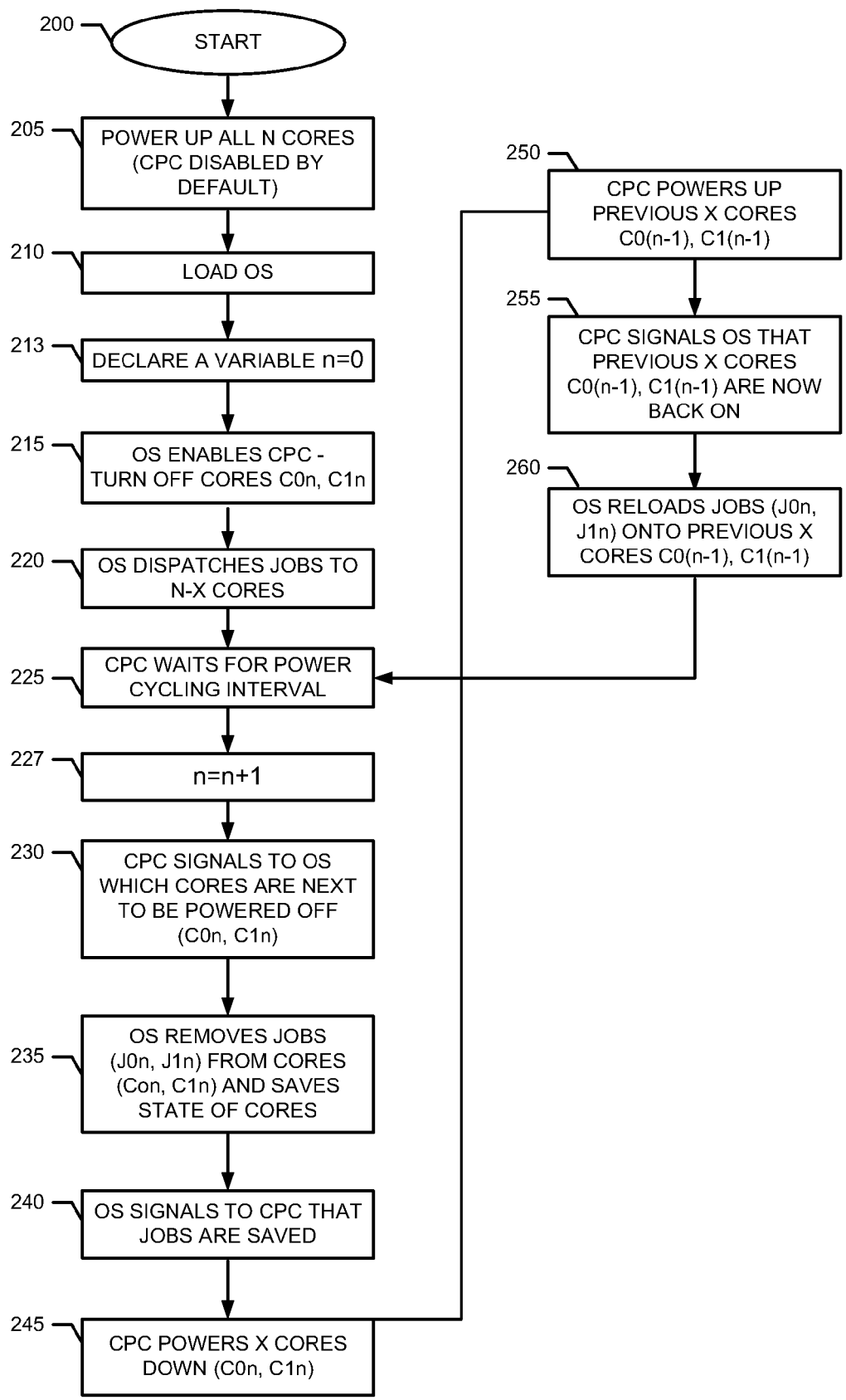
FIG. 2 is a flowchart that depicts process flow for the processor of FIG. 1.

FIG. 1 shows one embodiment of the disclosed multi-core processor as processor 100. Processor 100 includes a semiconductor die 105 with 16 processor cores thereon, namely processor cores 1A, 1B, 1C, 1D, 1E, 1F, 1G, 1H and processor cores 2A, 2B, 2C, 2D, 2E, 2F, 2G, 2H. The number of cores in this example is illustrative. In actual practice, processor 100 may employ more processor cores or fewer processor cores than shown in FIG. 1 depending on the particular application. In one embodiment, processor 100 systematically cycles each of the processor cores off over time to effectively spread out heat generation across die 105. Processor 100 allows each core to rest and cool for a predetermined amount of time before processor 100 turns a core back on. Processor 100 may turn a particular core off by turning power to that particular core off. Processor 100 may also turn a particular core off by clock gating that core, namely halting any clocks signals that the particular core would otherwise receive. In the case of clock gating, the clock gated core will still draw some leakage current. However, even with some leakage current, when the processor clock gates a particular core, this action still causes a substantial heat reduction as compared to the fully powered operating core.

Processor 100 includes chip logic 110 that interfaces the processor cores with components external to processor 100. Chip logic 110 may include circuitry that performs support functions for the multiple cores such as a memory controller, L2 cache and I/O interfaces, for example. The multiple cores each include the main architectural processing elements of the processor such as an instruction fetcher, instruction decoder, instruction queue, register file and execution units, for example. The chip logic 110 of multi-core processor 100 includes a core power controller 115 that couples to each of cores 1A, 1B, . . . 1H and 2A, 2B, . . . 2H. For simplicity of illustration, FIG. 1 shows the connection of core power controller 115 to cores 1A, 1F and 2D. However, core power controller 115 also couples to each of the remaining cores. Respective arrows represent the connections between the processor cores and core power controller 115. The direction of the arrows from the core power controller 115 to the processor cores signifies that the controller selectively controls which particular cores are active, namely powered on, during any particular time interval. Core power controller 115 receives power from a power supply 120 that couples thereto. Core power controller 115 determines to which of the processor cores it will supply power. In this manner, core power controller 115 can selectively enable and disable particular processor cores.

In one embodiment, core power controller 115 systematically instructs the multiple cores of processor 100 when to turn on and when to turn off. For example, processor 100 may employ an N–X (N minus X) pattern wherein "N" represents the number of cores on the semiconductor die and "X" represents the number cores that core power controller 115 turns off or disables at any particular point in time. In the example of FIG. 1, N=16 cores and X=2 cores such that core power controller 115 instructs 2 cores to power down and the remaining N–X=14 cores to remain powered up at any particular point in time. Core power controller 115 maintains a selected 2 of the cores off for a predetermined period of time, namely the power control interval (PCI), and then selects another 2 different cores to turn off for the next predetermined period of time or PCI. Core power controller 115 continues turning off or disabling a different 2 core set for each interval PCI until it cycles through all 16 cores. Upon completion of that cycle of powering off the 16 cores, 2 at a time, core power controller 115 continues power cycling in the same manner by repeating the process over and over again. In the examples herein, turning off or disabling a core includes turning off power, voltage or current to a core as well as well as clock gating a core.

In the embodiment shown in FIG. 1, core power controller 115 may cycle cores off in the order shown in Table 1 below by way of example:

TABLE 1

| Time Interval | Core OFF | Core OFF |
|---|---|---|
| 1 | 1A | 2A |
| 2 | 1B | 2B |
| 3 | 1C | 2C |
| 4 | 1D | 2D |
| 5 | 1E | 2E |
| 6 | 1F | 2F |
| 7 | 1G | 2G |
| 8 | 1H | 2H |

In this arrangement, during time interval 1, core power controller 115 cycles cores 1A and 2A off while the remaining 14 cores remain on. In time interval 2, core power controller 115 turns cores 1A and 2A back on while turning cores 1B and 2B off. This cycling on and off sequence continues as per Table 8 until the last of the cores 1H and 2H turn off in time interval 8. Time intervals 1 through time interval 8 form a complete cycle wherein each core is off at least once. When time interval 8 completes, then the process shown in Table 1 repeats in the next time interval after time interval 8 where, just like in time interval 1 previously, core power controller 115 again turns cores 1A and 2A off. Core power controller 115 thus disables and enables cores in a predetermined sequence given in Table 1 as one example. In this particular example, controller 110 avoids disabling adjacent processor cores in the same time interval or consecutive time intervals. In this manner, multi-core processor 100 controls heat generation by its cores by effectively spreading average heat generation across the processor's semiconductor die. In one embodiment, processor 100 may achieve some cooling improvement or heat distribution spreading across the semiconductor die by employing a random pattern of disabled processor cores over time.

In another embodiment, processor 100 employs an N–X pattern to systematically cycle through and disable or turn off the cores thereof. In this example, N=16 total cores and X=4 cores to turn off per time interval, PCI. Table 2 shows such a pattern below:

TABLE 2

| Time Interval | Core OFF | Core OFF | Core OFF | Core OFF |
|---|---|---|---|---|
| 1 | 1A | 2A | 2E | 1E |
| 2 | 1G | 2G | 1C | 2C |
| 3 | 2D | 1D | 1H | 2H |
| 4 | 1B | 2B | 2F | 1F |

In the embodiment wherein processor 100 employs an N–X pattern to systematically cycle through and turn off the cores thereof, N=16 total cores and X=8 cores to turn off per time interval, PCI. Table 3 shows such a pattern below:

TABLE 3

| Time Interval | Core OFF | Core OFF | Core OFF | Core OFF | Core OFF | Core OFF | Core OFF | Core OFF |
|---|---|---|---|---|---|---|---|---|
| 1 | 1A | 1G | 2E | 1C | 2A | 2G | 1E | 2C |
| 2 | 2D | 1B | 1H | 2F | 1D | 2B | 2H | 1F |

This Table 3 embodiment, wherein core power controller 115 disables half of the cores (eight) per time interval, achieves a significantly higher reduction of heat generation than the Table 1 and Table 2 embodiments discussed above. This improvement in heat reduction allows clocking of the enabled cores at much higher frequencies. In another embodiment, a processor includes a number of cores N=2 as a minimum and the processor turns one core off during a time interval and then the other core off during the next time interval in alternating fashion.

In the embodiment discussed above, processor cores turn off according to a predetermined pattern or sequence that core power controller 115 implements. The design may hard code such a geometric pattern into the core power controller 115 at design time. In an alternative embodiment, it is possible that the designer may install several different patterns into the core power controller 115 and select a pattern for use at a later time. In one embodiment of the multi-core processor, the cores that are off during a particular time interval have locations on the die not directly next to one another.

FIG. 2 is a flowchart that depicts process flow of the embodiment shown in FIG. 1 except that for convenience C0, C1, . . . C15 now designate the 16 cores of processor 100. Process flow commences at the start block 200. Processor 100 powers up all cores, as per block 205. At this point in time, processor 100 disables core power controller (CPC) 115 by default. Processor 100 then loads an operating system, as per block 210. Block 213 declares a variable n=0 as shown. Next, as per block 215, the operating system enables core power controller 115 so that cycling on and off of selected processor cores may commence. At this point in time, a time interval commences and controller 115 turns "X" cores off. More specifically, in this first time interval the processor turns off cores C0$n$ and C1$n$ wherein n=0 as per block 213, such that cores C00 and C10 turn off. In this particular example that disables two cores per time interval, n will vary from 0 to 7 to cover all of the cores. In one embodiment, cores C0$n$ and C1$n$ (namely cores C00 and C10) may correspond to cores 1A and 2A of FIG. 1/Table 1 so that cores 1A and 2A turn off during the first time interval for which n=0. The operating system then dispatches jobs to the remaining "N−X" cores, namely the other 14 cores in this case, as per block 220.

Core power controller 115 waits for the first time interval to end, as per block 225. The variable n then increments such that n=n+1, as per block 227. Another term for this time interval is the power cycling interval. The power cycling interval describes the amount of time during which the selected processor cores remain off before turning back on in the next power cycling interval. The core power controller 115 instructs the operating system with respect to the next two cores to turn off in the next power cycling interval, as per block 230. Since n now equals 1 in the second time interval, the two cores that turn off are C0$n$, C1$n$, or more specifically C01, C11. In one embodiment these cores may correspond to cores 1B. 2B of Table 1. The operating system removes jobs J0$n$, J1$n$ from cores C0$n$, C1$n$ and saves the states of these cores, as per block 235. Examples of partitioning software that can move jobs from one core to another include Hypervisor™ software (Hypervisor is a ™ of the IBM Corp.) and Virtualization Engine™ software (Virtualization Engine is a ™ of the IBM Corp.). When this task of moving the jobs completes, the operating system signals core power controller 115 that it saved the removed jobs, as per block 240. The core power controller 115 then powers down the cores C0$n$, C1$n$, as per block 245.

The core power controller 115 then powers up the 2 processor cores that were previously off, namely C0($n$-1) and C1($n$-1), which correspond to C0(1-1) and C1(1-1), namely C00 and C11. More particularly, cores 1A and 2A turn back on. The core power controller 115 then signals the operating system that the previously off cores, C0($n$-1) and C1($n$-1), are now again operational or powered-up, as per block 255. The operating system then reloads jobs J0$n$, J1$n$ on to the now powered-up on cores C0($n$-1) and C1($n$-1), as per block 260. Process flow then continues back to block 225 at which core power controller 115 waits for the power cycling interval to transpire. The process continues from that point forward until processor 100 cumulatively turns off all of the processor cores, two at a time. When processor 100 reaches this point, the controller 115 continues with another round of power cycling cores off. Power cycling cores off in this manner may continue indefinitely to effectively spread out the cooling effect to the multiple cores during long term processor operation.

Figure 3:
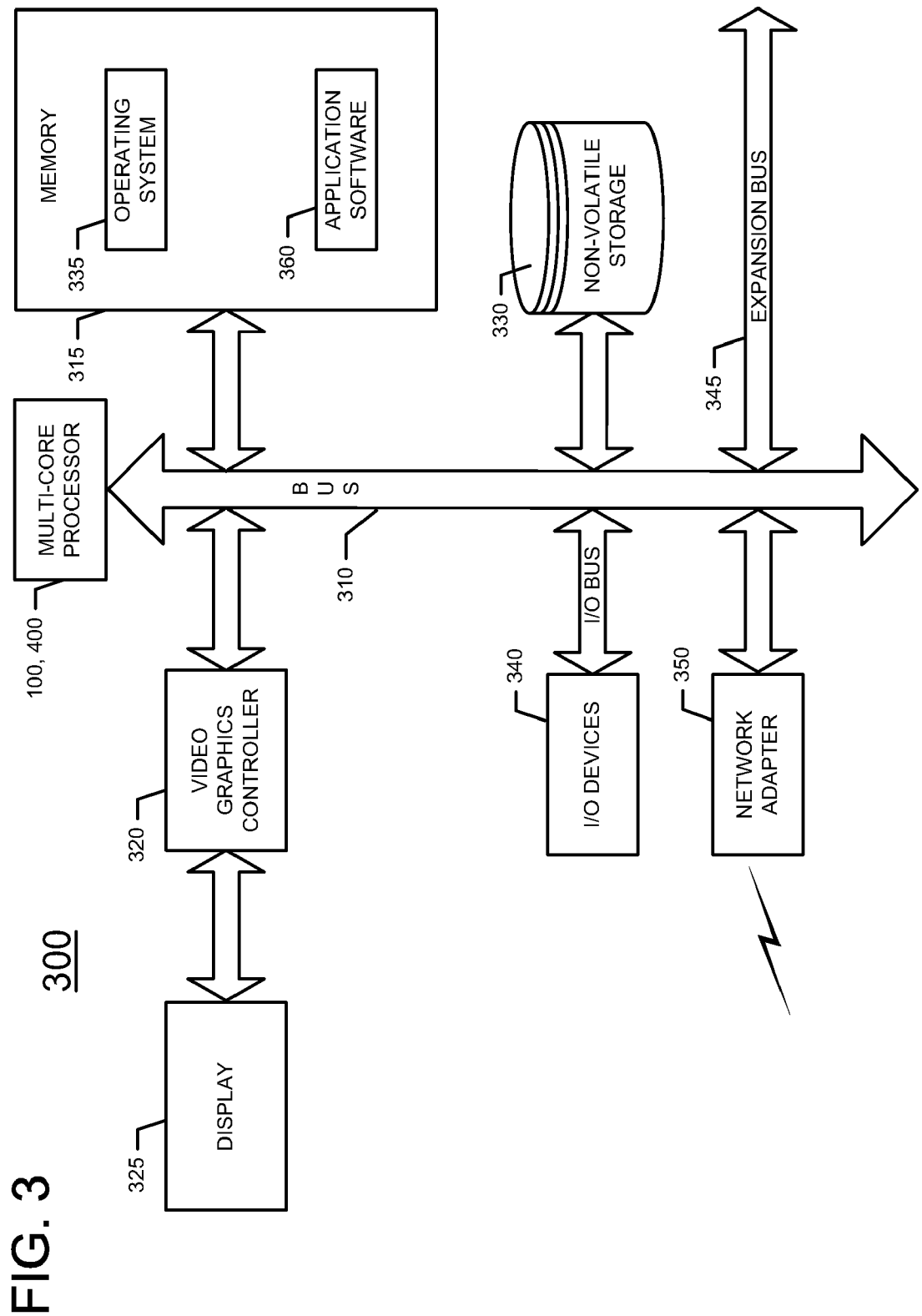
FIG. 3 shows a block diagram of an information handling system that employs the disclosed processor.

FIG. 3 shows an information handling system (IHS) 300 that employs multi-core processor 100 of FIG. 1 or multi-core processor 400 of FIG. 4 as a processor for the IHS. IHS 300 includes a bus 310 that couples processor 100 to system memory 315 and video graphics controller 320. A display 325 couples to video graphics controller 320. Nonvolatile storage 330, such as a hard disk drive, CD drive, DVD drive, or other nonvolatile storage couples to bus 310 to provide IHS 300 with permanent storage of information. An operating system 335 loads in memory 315 to govern the operation of IHS 300. I/O devices 340, such as a keyboard and a mouse pointing device, couple to bus 310. One or more expansion busses 345, such as USB, IEEE 1394 bus, ATA, SATA, PCI, PCIE and other busses, couple to bus 310 to facilitate the connection of peripherals and devices to IHS 300. A network adapter 350 couples to bus 310 to enable IHS 300 to connect by wire or wirelessly to a network and other information handling systems. While FIG. 3 shows one IHS that employs processor 100, 400, the IHS may take many forms. For example, IHS 300 may take the form of a desktop, server, portable, laptop, notebook, or other form factor computer or data processing system. IHS 300 may take other form factors such as a gaming device, a personal digital assistant (PDA), a portable telephone device, a communication device or other devices that include a processor and memory. IHS 300 loads application software 360 from non-volatile storage to memory 315 for execution by processor 100.

FIG. 4 shows another embodiment of the disclosed multi-core processor as processor 400. Processor 400 includes a semiconductor die 405 with 16 processor cores thereon, namely processor cores D1, D2, D3, . . . D16. The number of cores in this example is illustrative. In actual practice, processor 400 may employ more processor cores or fewer processor cores than shown in FIG. 4 depending on the particular application. Processor 400 includes chip logic 410 that interfaces the processor cores with components external to processor 400. Chip logic 410 may include circuitry that performs support functions for the multiple cores such as a memory controller, L2 cache and I/O interfaces, for example. The multiple cores each include the main architectural processing elements of the processor such as an instruction fetcher instruction decoder, instruction queue, register file and execution units, for example.

The chip logic 410 of multi-core processor 100 includes a core power controller 415 that couples to each of cores D1, D2, D3, . . . D16. FIG. 4 shows a representative connection between processor core D1 and core power controller 415. Power supply 420 supplies power to core power controller 415. Core power controller 415 controls the distribution of this power to each of the processor cores, D1, D2, D3, . . . D16. In this manner, core power controller 415 controls which of the processor cores exhibits an enabled state and which of the processor cores exhibits a disabled state. Each processor core D1, D2, D3, . . . D16 includes a respective thermal sensor, TS, so that each core can report its temperature back to core power controller 415. The connections between processor core D1 and core power controller 415 are representative of the connections between the remaining processor cores D2 . . . D16. However, for simplicity, FIG. 4 only shows the connections between processor core D1 and core power controller 415. The thermal sensor, TS, of processor core D1 couples to core power controller 415 via a temperature report line, T-D1. Temperature report line T-D1 reports the temperature of processor core D1 back to core power controller 415 in real time. The remaining processor cores D2 . . . D16 employ similar respective temperature report lines T-D2 . . . T-D16 (not shown) so that core power controller 415 is aware of the respective temperatures of the processor cores in real time.

A control line C-D1 couples processor core D1 to core power controller 415 as shown. Using control line C-D1, core power controller 415 may instruct processor core 415 to power off or to halt processor core 415 by clock gating. The remaining processor cores D2 . . . D16 employ similar respective control lines C-D2 . . . CD16 (not shown) so that power controller 415 may turn off the respective processor cores when it determines that particular cores become too hot. In other words, power controller 415 turns a particular processor core off to cool when the temperature of the particular processor core exceeds a predetermined temperature value. Turning off hot cores in this manner allows these hot cores to cool. In one embodiment, power controller 415 turns on or re-enables a previously hot core when the temperature of that core cools to a normal operating temperature that is less than the predetermined temperature value at which the controller disabled the processor core.

In one embodiment, core power controller 415 senses the respective temperatures of all of processor cores D1 . . . D16 and selects the hottest cores of this group for shutdown. In one embodiment, core power controller 415 may select any number of processor cores for shutdown. Typically, core power controller 415 shuts down the hottest cores that it observes on temperature report lines T-D1 . . . T-D16. The larger the number of cores that core power controller 415 shuts down, the greater the amount of cooling the processor achieves. When core power controller 415 shuts down a relatively low number of cores in comparison to the total number of cores, the impact on overall processor performance is relatively small. For example, in a 16 core processor 400 such as shown in FIG. 4, turning off 1, 2 or even 3 cores may not substantially impact performance.

In the embodiment now discussed, core power controller 415 turns off the single hottest core that it observes. Once multi-core processor 400 initializes, the thermal sensors, TS, in cores D1 . . . D16 report the respective temperatures of cores D1 . . . D16 to core power controller 415 via temperature report lines T-D1 . . . T-D16. (In FIG. 4, only temperature report line T-D1 is shown.) Core power controller 415 then determines which of cores D1 . . . D16 exhibits the highest temperature. Assuming for purposes of discussion that core D1 exhibits the highest temperature, in response to this temperature report core power controller 415 instructs core D1 to turn off by sending core D1 an appropriate turn off signal on control line at C-D1. When core power controller 415 observes that the temperature of core D1 decreases to an acceptable temperature, then core power controller 415 may instruct core D1 to turn back on. In one embodiment, processor 400 may employ an N channel comparator in core power controller 415, wherein N is the number of processor cores in processor 400. The N channel comparator determines which report line T-D1 . . . T-D16 exhibits the highest temperature value. Core power controller 415 then turns off the particular core that exhibits the highest temperature.

In another embodiment, core power controller 415 determines the two hottest processor cores and turns those cores off either for a predetermined interval of time or until the temperatures of those processor cores cools to a predetermined acceptable temperature. In this example, core power controller 415 once again observes the temperatures of cores D1 . . . D16 by checking the respective core temperatures that temperature report lines T-D1 . . . T-D16 report. Core power controller 415 determines the two hottest processor cores. In this particular example, processor cores D5 and D9 exhibit the highest temperatures of the group of processor cores. In response, core power controller 415 informs the operating system that cores D5 and D9 are about to turn off. In response, the operating system transfers any jobs that cores D5 and D9 handle to other cores which now carry those jobs forward to execution. After the successful transfer of these jobs, core power controller 415 sends control signals on control lines C-D5 and C-D9 (both not shown) to instruct respective processor cores D5 and D9 to shut off or commence clock gating. After a predetermined period of time transpires, core power controller 415 again the checks the core temperatures on temperature report lines T-D1 . . . T-D16 to determine which 2 cores now exhibit the highest temperatures. Assume that core power controller 415 determines that processor cores D7 and D15 now exhibit the highest temperatures. In this event, core power controller 415 instructs the operation system to shift jobs away from processor cores D7 and D15 to other cores. Core power controller 415 powers cores D1 and D16 back on and then powers the now two hottest cores D7 and D15 off for the next time interval. This process continues in real time with core power controller 415 turning off the two hottest cores that it observes in each time interval.

Figure 5:
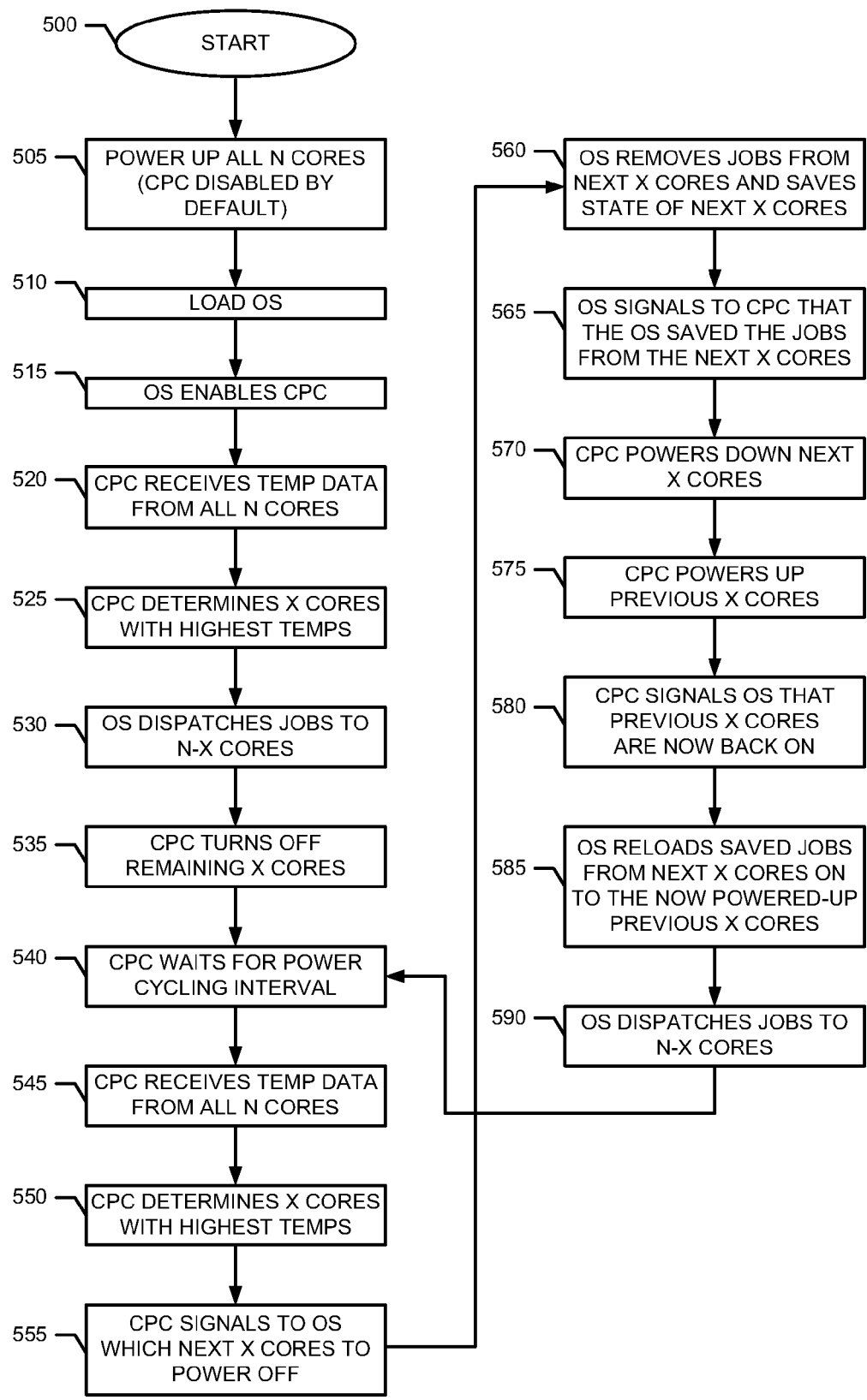
FIG. 5 is a flowchart that depicts process flow for the processor of FIG. 4.

FIG. 5 shows a flow chart of a representative process flow for the processor 400 embodiment of FIG. 4 wherein core power controller 415 turns off X cores of N total cores when it determines that the X cores exhibit a temperature that exceeds a predetermined temperature value. In this particular example, processor 400 includes N total cores wherein N=16. In actual practice, processor 400 may include more cores or fewer cores than 16 with N=2 cores as a lower bound. Also, in this particular example, core power controller 415 will turn off X=2 cores at a time. In practice, core power controller 415 may turn off more cores than 2 or fewer cores than two with X=1 as a lower bound. In another embodiment, X=2 cores may be a lower bound.

Process flow commences at start block 500 after which processor 400 powers up all N cores, as per block 505. At this point in time, processor 400 holds core processor controller 415 in a disabled state by default. Processor 400 loads the operating system (OS), as per block 510. The operating system then enables core processor controller 415 to begin its core control operations, as per block 515. Core processor controller 415 receives temperature data from the respective temperature sensors (TS) in processor cores D1-D16, as per block 520. In this manner, core processor controller 415 continually knows the temperatures of the respective cores in real time. Core power controller 415 analyzes the temperature data from all of the cores to determine which X cores exhibit the highest temperatures, as per block 525. In this particular example wherein X=2 cores, controller 415 may determine that processor cores D3 and D7 exhibit the two highest temperatures among the processor cores. The operating system then dispatches jobs to the N–X cores, as per block 530. In other words, the operating system dispatches jobs to all processor cores except the two cores exhibiting the highest temperatures, namely processor cores D3 and D7. Core power controller 415 turns off the remaining X cores, namely the two cores D3 and D7 exhibiting the highest temperatures, as per block 535.

Process flow continues to block 540 at which the core power controller 415 waits for the duration of a time interval also known as the power cycling interval. During each power cycling interval, core power controller 415 reads the temperatures of the cores and determines the two highest temperature cores to power off for cooling purposes. When the first time interval completes, processor 400 commences a next time interval and the first time interval becomes the previous time interval. In this next time interval, core processor controller 415 again receives temperature data from all of the N cores, as per block 545. From this temperature data, controller 415 determines the X cores that exhibit the highest temperatures, as per block 550. In this particular example, core power controller 415 finds that cores D10 and D14 exhibit the two highest temperatures among the cores. Core power controller 415 then signals the operating system the next X cores to turn off, as per block 555. Thus, in this next time interval, controller 415 instructs the operating system to turn off processor cores D10 and D14. The operating system responds by removing any jobs from the next X cores D10 and D14, and saving their respective states, as per block 560. The operating system then signals core power controller 415 that the OS saved the jobs from these next X cores D10 and D14, as per block 565. Core power controller 415 now powers down these next X cores D10 and D14, as per block 570. At this point, core power controller 415 restores power to the previous X cores, namely cores D3 and D7, as per block 575. Core power controller 415 now signals the operating system that the previous X cores D3 and D7 are again powered-up and operational, as per block 580. The operating system then reloads the saved jobs from the next X processor cores D10 and D14 to the now again powered-up previous X processor cores D3 and D7 as per block 585. Next, the operating system dispatches jobs to the N−X cores that now exhibit a powered-up state, as per block 590. Processor 400 then enters yet another time interval and the process repeats when process flow continues to time interval block 540.

In an alternative embodiment, the temperature sensing circuitry TS in each processor core D1 . . . D16 of FIG. 4 may incorporate control circuitry that shuts down the respective processor core when that core exhibits a temperature in excess of a predetermined temperature value. In other words, the individual processor core makes the decision to turn off or disable rather than controller 415. For example, if the temperature sensing circuitry TS in processor core D3 determines that processor core D3 is too hot, the TS circuitry so informs controller 415. In response, controller 415 still takes the actions discussed above to communicate with the operating system (OS) to transfer a job from processor core D3 to another processor core. When the temperature of processor core D3 returns to an acceptable normal operating temperature less than the predetermined temperature value, circuitry TS of processor core D3 so informs controller 415. Controller 415 then communicates with the OS to inform the OS that processor core D3 is once again available to perform processing tasks. When representative processor core D3 turns off, it does not fully power off because temperature sensing circuitry TS remains on to report to controller 415 that processor core D3 exhibits either an enabled or disabled state. Clock gating the remainder of the processor core or powering off the remainder of the processor core allows the core to cool to lower temperatures acceptable for normal operation of the processor core. Process flow for this alternative embodiment is similar to the flowchart of FIG. 5 except that each processor core makes a decision locally on that core with respect to whether or not to turn off.

FIG. 6 is a flowchart that demonstrates how processor 400 may operate in a high frequency burst mode to increase processor performance beyond the clock speed nominally associated with the processor. By way of example, test procedures may rate the normal operating clock speed of the cores of the multi-core processor at a frequency of 2 GHZ. However, processor 400 achieves an effectively higher performance level by assigning tasks or jobs to a core that operates in a burst mode speed of, for example 4 GHz, for a short amount of time or until the temperature sensor in that core reports an excessively high temperature. The burst mode speed is substantially higher than the normal rated speed of the processor core. In the event of a high temperature reading exceeding a predetermined temperature value, processor 400 turns the bursting core off and assigns that core's job to another core that may now also commence a high speed burst mode of operation. The core that is now off cools and later becomes available for processing jobs after cooling to a predetermined normal operating temperature value. Again, clock gating and powering off a core provide two ways to turn a hot core off or disable a core to allow cooling.

Returning to FIG. 4, processor 400 includes a clock circuit, CLK1 that operates at a clock frequency of 2 GHz and another clock circuit CLK2 that operates at a burst mode clock frequency of 3 GHz. While FIG. 4 shows clock circuits CLK1 and CLK2 only coupled to representative processor core D1, in practice processor 400 configures clock circuits CLK1 and CLK2 so that each processor may receive the CLK1 clock signal to operate in a normal operational mode or the CLK2 signal to operate in the high speed burst mode. Thus, clock circuits CLK1 and CLK2 may couple to the remaining processor cores D2 . . . D16. Core power controller 415 instructs each process core to either to use the CLK1 clock signal or the CLK2 burst clock signal. Core power controller 415 may instruct a single processor core, or multiple processor cores, to operate in the high speed burst mode by using the CLK2 clock signal.

The flowchart of FIG. 6 includes many blocks in common with the flowchart of FIG. 5. Like numbers indicate like process steps. The subsequent description discusses those blocks in FIG. 6 that are different from the FIG. 5 flowchart. At block 630, the operating system dispatches jobs to the N−X cores. As part of that dispatch, the operating system may instruct one or more of the N−X cores to operate in a high speed burst mode, namely at a clock speed significantly higher than the processor's clock speed rating for normal continuous operation. For example, in a 2 GHz continuous duty-rated processor, the operating system may instruct individual cores to operate for short bursts of time at 3 GHz, 4 GHz or other selected burst frequency value. The time interval or power cycling interval that block 540 specifies is set to be sufficiently short to not damage the core to which the operating system assigns the task for execution in burst mode. However, should the temperature of one or more cores become undesirably high, the thermal sensors in the cores report the core temperatures back to core power controller 415. In response, core power controller 415 may shut off those cores whose bursting activities result in too high a temperature. Thus, for such burst mode operations, the individual cores may be protected first by the shortness of the selected time interval for which the core exhibits a powered-up state, and second by the core power controller 415 that withdraws power from the N cores that exceed a predetermined temperature. Block 690 may also dispatch jobs in the burst mode.

The foregoing discloses a multi-core processor that cycles selected processor cores in the processor off in a predetermined pattern across the processor over time to reduce average heat generation by the processor. In one embodiment, the disclosed multi-core processor avoids undesirable hot spots in the processor.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of controlling heat generation in a processor, the method comprising:
   receiving power by a processor that includes a plurality of processor cores situated on a common semiconductor die, each processor core being enabled or disabled; and
   controlling the processor cores, by a core power controller, such that different processor cores are disabled over time, the power controller disabling different processor cores in different respective time intervals in a predetermined pattern to spread out heat generation across the semiconductor die, the power controller enabling adjacent processor cores in consecutive time intervals.

2. The method of claim 1, further comprising repeating, by the core power controller, the predetermined pattern of disabled processor cores over time.

3. The method of claim 2, wherein the core power controller disables each processor core at least once prior to repeating the predetermined pattern of disabled processor cores.

4. The method of claim 1, wherein the core power controller disables a plurality of processor cores at the same time.

5. The method of claim 4, wherein the core power controller disables processor cores in a manner that avoids disabling adjacent processor cores at the same time.

6. The method of claim 1, wherein the step of controlling the processor cores includes one of clock gating a selected processor core to disable the selected processor core and powering off the selected processor core to disable the processor selected core.

7. The method of claim 1, further comprises transferring a job from a first processor core that will subsequently become disabled to a second processor core that is enabled prior to disabling the first processor core.

8. A processor comprising:
   a plurality of processor cores situated on a semiconductor die; and
   a core power controller, coupled to the plurality of processor cores and situated on the semiconductor die, the core power controller being configured to enable and disable each of the processor cores such that different processor cores are disabled over time, the power controller disabling different processor cores in different respective time intervals in a predetermined pattern to spread out heat generation across the semiconductor die, the power controller enabling adjacent processor cores in consecutive time intervals.

9. The processor of claim 8, wherein the core power controller is configured to repeat the predetermined pattern of disabled processor cores over time.

10. The processor of claim 9, wherein the core power controller is configured to disable each processor core at least once prior to repeating the predetermined pattern of disabled processor cores.

11. The processor of claim 8, wherein the core power controller is configured to disable a plurality of processor cores at the same time.

12. The processor of claim 8, wherein the core power controller is configured to disable processor cores in a manner that avoids disabling adjacent processor cores at the same time.

13. The processor of claim 8, wherein the core power controller is configured to disable a selected processor core by one of clock gating the selected processor core and powering off the selected processor core.

14. An information handling system (IHS) comprising:
   a memory;
   a processor, coupled to the memory, the processor including:
      a plurality of processor cores situated on a semiconductor die; and
      a core power controller, coupled to the plurality of processor cores and situated on the semiconductor die, the core power controller being configured to enable and disable each of the processor cores such that different processor cores are disabled over time, the power controller disabling different processor cores in different respective time intervals in a predetermined pattern to spread out heat generation across the semiconductor die, the power controller enabling adjacent processor cores in consecutive time intervals.

15. The IHS of claim 14, wherein the core power controller is configured to disable a plurality of processor cores at the same time.

16. The IHS of claim 14, wherein the core power controller is configured to disable processor cores in a manner that avoids disabling adjacent processor cores at the same time.

17. The IHS of claim 14, wherein the core power controller is configured to disable a selected processor core by one of clock gating the selected processor core and powering off the selected processor core.

* * * * *